Aug. 24, 1926.
R. W. PHILBROOK
PIPE CLAMP
Filed Oct. 6, 1925
1,596,944
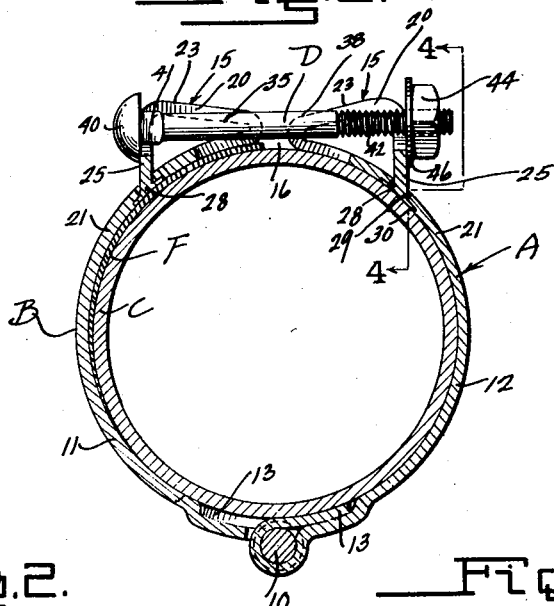
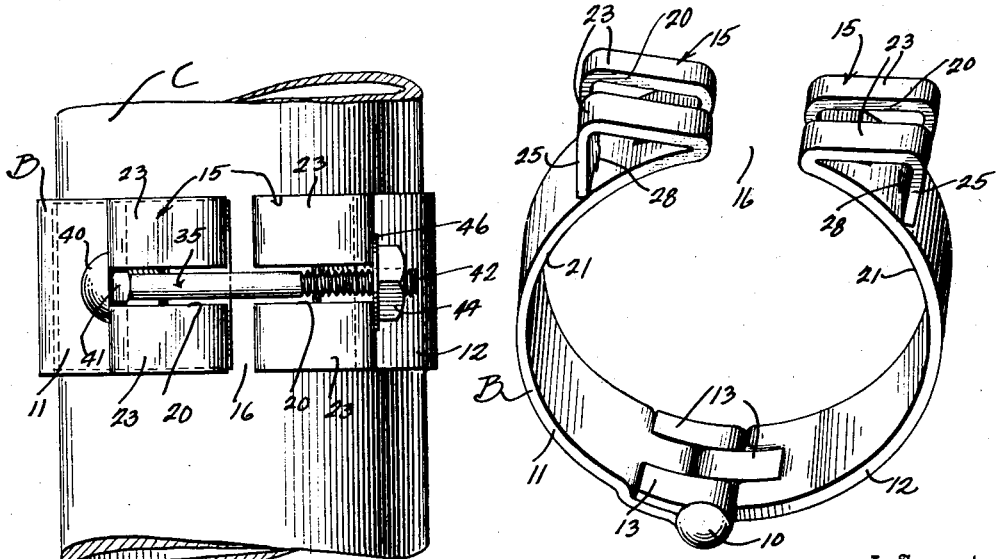
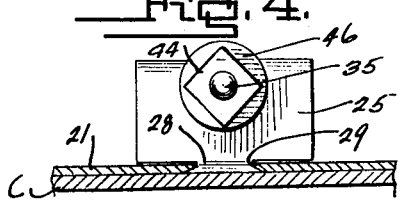
Ralph W. Philbrook, Inventor Patented Aug. 24, 1926.

1,596,944

UNITED STATES PATENT OFFICE.

RALPH W. PHILBROOK, OF SHERMAN, CALIFORNIA, ASSIGNOR TO PHILBROOK SPRING PIPE CLAMP COMPANY, OF LOS ANGELES, CALIFORNIA, A PARTNERSHIP COMPOSED OF R. W. PHILBROOK, M. F. PRESCOTT, C. B. MESKIMONS, AND J. R. PRESCOTT.

PIPE CLAMP.

Application filed October 6, 1925. Serial No. 60,871.

This invention relates to improvements in pipe clamps.

The primary object of this invention is the provision of a clamp adapted for use in the connection with pipes, hose, and the like, for the purpose of stopping leaks therein for the same purpose as set forth in my Patent #1,474,550, granted November 20, 1923.

A further object of this invention is the provision of a novel pipe clamp including improved means for regulating the clamping action thereof.

A further object of this inventon is the provision of an improved pipe clamp including a split band adapted to encircle a pipe, with improved means at the ends thereof for adjustably receiving a bolt in a durable and efficient manner for the purpose of regulating the clamping action of the clamp.

Other objects and advantages of this invention will be apparent during the course of the following detailed description.

In the accompanying drawing, forming a part of this specification, and wherein similar reference characters designate corresponding parts throughout the several views, Figure 1 is a transverse sectional view taken through the clamp, showing its clamping position upon a pipe.

Figure 2 is a plan view of the clamping end of the clamp in position upon a pipe.

Figure 3 is a perspective view of the clamp band and its novel construction.

Figure 4 is a sectional view taken substantially on the line 4—4 of Figure 1, and showing more particularly anchoring means for the novel bolt receiving structure of the pipe band.

In the drawing, wherein for the purpose of illustration is shown only a preferred embodiment of this invention, the letter A may generally designate the improved clamp which comprises a band B adapted to be placed upon a pipe C, and including bolt means D cooperating at the ends of the band B for holding the same in a sealing relation on the pipe C.

The band B is of course preferably of metal, and the same is split preferably at one pont. The band B is arranged in substantially cylindrical formation for receiving the pipe therethrough. Preferably, the band B is of two sections hingedly connected by a pintle 10, although it is to be understood that the clamp band may be of a single split piece. The joint formed by connection of the sections 11 and 12 includes overturning the end strips 13 thereof to provide barrel portions for receiving the pintle 10 therein, much after the same manner set forth in my patent above referred to, and as is clearly illustrated in Figure 3 of the drawing, the portions 13 at their overlapping with the sections 11 and 12 being countersunk to preserve the continuity of the periphery at the inside of the clamp band B.

The novel construction of the clamp band B lies in the provision of bolt receiving portons 15 at the ends thereof adjacent the split space 16. These bolt receiving portions 15 are of similar formation, and they are formed by looping the ends of the clamp sections 11 and 12 in triangular arrangement. Prior to the bending of these portions 15, the same are slotted at 20, and the slots, and said slots are closed at their ends. After the slots 20 have been formed, the portions 15 are bent to each provide a top wall including the spaced arms 23 arranged in the same plane, in divergent relation with respect to the body portions 21 of the sections upon which they are provided; the arm portions 23 being bent divergent from the convex side of their respective sections 11 or 12, away from the split space 16, and of course tangentially arranged upon the band D. The portions 15 also provide the bolt head and nut receiving plates or arms 25, substantially in right angled relation with respect to the arms 23, in tangential relation with respect to the band B, bent toward the respective sections 11 and 12 upon which the portions 15 are positioned; the clamp body facing ends of the plates 25 each having an anchoring tongue 28 which enters a suitable recess 29 provided in the respective sections 11 and 12, and these tongues 28 enter the openings 29 and are countersunk or peened over at 30 at the inside periphery of the respective sections of the band B, as is illustrated in Figures 1 and 4 of the drawing, to effectively anchor the portions 15.

It is to be particularly noted that the slot 20 extends thru the body portion 21 of the sections 11 and 12; spaces the arms 23 of each of the portions 15 from each other, and said slots furthermore extend downwardly for about half the length of each of the plates 25. These portions of the slots 20 are all in alignment transversely of the band, for receiving the shank of the bolt 35.

An important feature of the invention is that the bolt head and nut receiving plates 25 are located in parallel relation when the clamp band is adjusted upon a pipe C, and they are spaced in parallel relation with a plane through the pintle pin and the split opening of the clamp band, as can readily be seen from Figure 1 of the drawing. This enables the use of a straight bolt of conventional character, preferably a carriage bolt. The bolt 35 includes the shank or body 38 provided with a head 40 at one end thereof, and the shank 38 adjacent the head 40 is squared at 41, as in carriage bolt construction. The opposite screw threaded end 42 of the shank 38 is adapted to receive a nut 44. In the application of the bolt upon the portions 15 of the clamping band B, the shank 38 of the bolt lies in the aligning slots 20 of the portions 15 at the ends of the clamp band sections 11 and 12, and may be readily inserted therein without detaching the nut 44 from the bolt shank. The squared portion 41 of the bolt lies in the slotted portion of one of the plates 25, with the head portion against that plate, and the shank extends transversely across the split of the band and at its screw threaded end extends thru the slot portion of the other plate 25, and the bolt 44 is clamped against the last mentioned plate portion 25, preferably with a washer 46 disposed therebetween. It can readily be understood that upon adjustment of the nut 44, the gap between the ends of the clamp band B will be either widened or narrowed to adjust the internal diameter of the clamp band B.

In its application upon a pipe a gasket F is preferably used between the pipe C and the band B, across a leak in the pipe, and of course the clamp band B upon its contraction seals this leak by forcing the gasket up against the leak.

From the foregoing description of this invention it is apparent that a novel type of clamp has been constructed, including a novel clamping band structure formed of stamped and bent metal which may be readily constructed. The portions 15 at the ends of the clamp band when formed as above mentioned are very durable, rigid, and incident to the slotting thereof transversely across the band, the bolt may be received without the necessity of detaching the nut of the bolt as is readily obvious.

Various changes in the shape, size, and arrangement of parts, such as the provision of one or more bolts or slotted loops at each of the ends of the clamp band sections may be made without departing from the spirit of this invention or the scope of the claims.

I claim:

1. In a pipe clamp the combination of a split ring of band metal having the end portions thereof bent backwardly upon the body of the metal adjacent the respective ends in loop shaped formation, the extreme ends of the loops of said rings being reduced, and the body of the ring adjacent said reduced ends being provided with openings for receiving the reduced ends of said loops in an anchoring relation therein, said loops at the ends of said ring having slots extending inwardly toward the ring.

2. In a pipe clamp the combination of a split band having the free ends thereof bifurcated adjacent said split band and turned back upon the respective ends of the band to provide spaced substantially parallel portions at each side of the split, and a bolt resting in the spaces between said portions at the ends of said band and engaging against the same and extending across the split of the band whereby upon adjustment of the bolt the ends of the band may be drawn together.

3. In a pipe clamp the combination of a split band having the ends thereof turned back upon themselves and slotted in aligning relation, inwardly from the outermost edges thereof, and bolt means for bodily disposition in said aligning slots for engagement with the turned back portions whereby upon adjustment to draw the ends of the band together.

4. In a clamp the combination of a split band including segmental body portions with slotted portions bent back outwardly thereupon at the ends thereof, and bolt means for said slots to adjust the position of the band.

5. As an article of manufacture a pipe clamp comprising a split band of substantially ring shaped formation including a body portion having the outer ends each bent back upon the said body portion to provide an outer flat elongated wall divergently extending with respect to the adjacent body portion, said wall at its outer end extending inwardly towards the adjacent body portion of the ring and being anchored thereto, whereby to provide loops at the ends of said body portion, said flat elongated top walls of said loops having slots extending therethrough, and adjustable bolt means resting in said slots with head and nut means in abutment against the said portions of said loops which are anchored to the respective ends of the body, whereby to adjust the opening through said band.

6. In a clamp of the class described a split band having the free ends thereof each triangularly looped to provide spaced elongated top wall portions, and substantially parallel end wall or shoulder portions, said shoulder portions being slotted in alignment with the slots of said top wall portions, and a bolt detachably disposed in the slots including head and nut means resting against the shoulder portions of said loops.

7. In a clamp of the class described a split band including segmental shaped body portions slotted in aligning relation at the ends thereof and opening at said ends, spaced top wall portions at each of the ends of said segmental portions, the spaces therebetween aligning with the slots of the segmental portions, shoulders formed in connected relation with the ends of said spaced top wall portions and the segmental portions, and providing slots therein aligning in extended relation with the space between the top wall portions at each of the ends of said band, and bolt means for detachably and adjustably resting in said aligning slots whereby to adjust the band.

8. In a clamp of the class described a split band including portions at each side of the split of said band providing openings therein, one of said openings being formed with parallel faces, and an adjusting bolt including a squared portion fitting in the opening against said parallel faces to prevent rotation of the bolt, said bolt extending across the split of the clamp in adjusting secured relation at the ends thereof.

9. In a clamp the combination of a split band including a pair of pivotally connected sections, each of said sections including a body portion slotted in open relation at the end thereof, a pair of spaced finger portions extended back upon the body portions in divergent relation therewith, and a plate portion secured at its free end in the segmental body portion, each plate portion having an opening therein in extended and aligning relation with the spaces between said fingers, and bolt means for adjustable disposition in the aligning slots and openings and in the spaces provided at the ends of the sections of said clamp.

10. In a pipe clamp the combination of a band metal split ring, the ends of said ring adjacent the split thereof being bent backwardly upon the ring in substantially loop-shaped formation at each end of the ring, said loops being slotted in aligning relation, and the plane of the slots lying in the same plane as the plane of said ring and opening outwardly away from said ring, each of said loops providing shoulders at the ends of the loops remote from the split of the ring, an adjusting bolt including a shank having a head integral on one end thereof and a screw threaded portion at the opposite end thereof, and a nut adjustable on said screw threaded portion, said bolt shank being adapted to be slipped bodily and laterally into said slots with the head lying against one shoulder of one loop and the nut adjustably positioned against the shoulder of the other loop whereby upon adjustment of the nut the loops may be drawn together for decreasing the size of the ring.

RALPH W. PHILBROOK.